United States Patent [19]
Ross

[11] Patent Number: 5,546,194
[45] Date of Patent: Aug. 13, 1996

[54] METHOD AND APPARATUS FOR CONVERTING A VIDEO IMAGE FORMAT TO A GROUP III FAX FORMAT

[75] Inventor: Jay B. Ross, Pennington, N.J.

[73] Assignee: Videofaxx, Inc., Lambertville, N.J.

[21] Appl. No.: 216,666

[22] Filed: Mar. 23, 1994

[51] Int. Cl.⁶ .............................. H04N 1/40; H04N 1/00; H04N 1/32; H04N 1/04
[52] U.S. Cl. .................... 358/445; 358/456; 358/400; 358/448; 358/479; 358/442; 382/298; 348/441
[58] Field of Search ........................ 358/457, 407, 358/438, 444, 456, 909, 261.1, 445, 400, 448, 468, 427, 479, 442; 382/56, 54, 298, 299; 346/76 PH; 379/88, 100; 348/441, 448, 459, 573, 458

[56] References Cited

U.S. PATENT DOCUMENTS

| | | | |
|---|---|---|---|
| 4,315,285 | 2/1982 | Sommer et al. | 358/280 |
| 4,399,470 | 8/1983 | Hibbard | 358/284 |
| 4,593,325 | 6/1986 | Kannapell et al. | 385/282 |
| 4,977,605 | 12/1990 | Fardeau et al. | 382/51 |
| 5,093,871 | 3/1992 | Klein et al. | 382/51 |
| 5,193,012 | 3/1993 | Schmidt | 358/456 |
| 5,235,432 | 8/1993 | Creedon et al. | 358/445 |
| 5,359,694 | 10/1994 | Concordel | 358/445 |

OTHER PUBLICATIONS

Lewis, Rhys, B.Sc., Ph.D., "Practical Digital Image Processing," IBM, UK Scientific Centre, Winchester, Hants, Ellis Horwood, Limited, 1990.

Csenger, Michael, "Brooktrout Ships Fax Server for Private Nets," *Communications Week*, Nov. 8, 1993, p. 25.

*Primary Examiner*—Edward L. Coles, Sr.
*Assistant Examiner*—Kimberly A. Williams
*Attorney, Agent, or Firm*—Gregory M. Howison

[57] ABSTRACT

A video-to-FAX conversion system includes a video camera (10) for generating video signals which are then captured by a frame grabber and stored in a frame buffer (14). The data in the frame buffer is comprised of digitized values from the video signal which are stored in pixels with a first aspect ratio. A conversion device (16) is operable to map information in the frame buffer to the binary output space of a Group III FAX protocol and perform contrast enhancement thereon. The contrast enhancement includes the steps of first generating a histogram of all of the pixel values in the frame buffer (14) after expansion thereof into the output space of the Group III FAX. The histogram values are then utilized to generate an adjusted value for each of the gray scale values available for the pixels in the frame buffer 14. Each pixel in the frame buffer (14) is then expanded and the contrast enhancement applied thereto to adjust the values therein. The pixels are then processed through a dithering operation to diffuse error across the output space and then a determination is made as to whether it is a black pixel or a white pixel. This operation is done on-the-fly such that an expanded frame buffer is not required, as only a predetermined number of horizontal scan lines are required for both the contrast enhancement and image dithering operation prior to sending them to a Group III formatter (18) and, subsequently, to a Group III FAX transmitter (20) for the output of the Group III FAX.

18 Claims, 6 Drawing Sheets

METHOD AND APPARATUS FOR CONVERTING A VIDEO IMAGE FORMAT TO A GROUP III FAX FORMAT

TECHNICAL FIELD OF THE INVENTION

The present invention pertains in general to facsimile apparatus, and more particularly, to an apparatus for receiving video image format and converting it to a Group III FAX format and then transmitting it as a Group III FAX.

BACKGROUND OF THE INVENTION

In present day technology, images are received and stored in various formats. On the reception end, the image can be input either through a scanner or through a frame grabber that is operable to receive a video input from a video camera, for example, and then digitize the image for storage thereof. Each of these input devices provides a predetermined format for the stored image. For example, the scanner has a pre-defined scanning head that determines the maximum resolution of the image. A relatively high resolution scanner may allow for 300 dots per inch (DPI) or more along the horizontal axis, each dot representing either a dark pixel (picture element) or a white pixel. This image is then stored as an image file with one of a predetermined number of image file formats. With respect to the frame grabber, this typically samples the incoming video on a given horizontal scan line, there being a predetermined number of horizontal scan lines per frame, and then dividing up the analog input value into "samples" or pixels that each have a digitized value of eight bits, representing the analog value. The image is then stored as a digitized frame in a frame buffer.

When an image is to be output, it is necessary to ensure that the stored image can be "mapped" to the output space of the output device. For example, if a scanner scanned at a resolution of 300 DPI and this were to be output on a laser printer at a resolution of, for example, 300 DPI, this would be a relatively easy task. However, if the resolution of the stored image were not equal to that of the output device, some adjustment would be required to map the full image to the full output space. One place this presents a problem is with respect to a received facsimile image, which typically has a resolution of 200 DPI. This would therefore require that each pixel be expanded to represent 1½ pixels on the output. However, if the output device were a facsimile image, this would require a 300 DPI stored image to be translated to a 200 DPI FAX image. Typically, the image is merely reduced by a factor of two such that it is 150 DPI and then transmitted such that it only occupies ¾ of a horizontal line in order to alleviate the need for translating pixels.

In order to convert a scanned image from either a scanner or a video source into pixels, it is necessary to perform various image enhancements. Since the input values from either a scanner or a video source are analog values, it is necessary to convert them to "gray-scales" in order to represent them with pixels that are either black or white. For example, a gray area would be represented by alternating black and white pixels. If the tone were decreased to a much grayer level approaching white, the number of white pixels would dominate the number of black pixels. This, of course, would be the reverse for a relatively dark gray area, wherein the black pixels would dominate over the white pixels. Since the eye cannot decipher individual pixels, it "averages the pixels". One area that has not been addressed for present technology is the receipt of a video image and subsequent retransmission of that image by facsimile. The difficulty that arises with this type of transmission is the incompatibility between the two formats. As described above, a facsimile typically operates at 200 DPI in a binary output space, wherein a typical video image is captured in an analog input space by a frame grabber and digitized with a resolution of 432 pixels across and 488 pixels along the vertical. The problem exists wherein it is necessary to map each pixel in the video image into black or white pixels in a facsimile transmission, and this mapping function controlled such that it covers the entire image or entire output space.

SUMMARY OF THE INVENTION

The present invention disclosed and claimed herein comprises a video-to-Group III FAX converter. The converter includes a video input for receiving a video image and digitizing it to provide sequential frames of input information. A first conversion device is provided for convening the frames in the video image to an array of digitized analog pixels in a frame buffer. These are arranged in a first image space that is not compatible with the output image space of the Group III FAX protocol. A mapping device is then operable to map the image space of the frame buffer to a binary image space associated with the Group III FAX format. This binary image space is comprised of binary image pixels. A FAX transmission device then transmits the binary image pixels in the binary image space via a Group III FAX protocol over a FAX transmission media.

In another aspect of the present invention, a contrast enhancement device is provided for adjusting the analog values in the frame buffer for optimal contrast in the binary image space. The mapping device is first operable to expand each of the pixels in the frame buffer to an associated portion of the binary image space. These expanded pixels are then processed with the contrast enhancement device to adjust the analog values therein. An image dithering operation is then performed on these expanded and enhanced pixel values to diffuse error across the binary image space, before conversion to the binary pixels. Thereafter, each of the pixel values is compared to a threshold and, if below the threshold, converted to a black pixel and, if above the threshold, converted to a white pixel.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
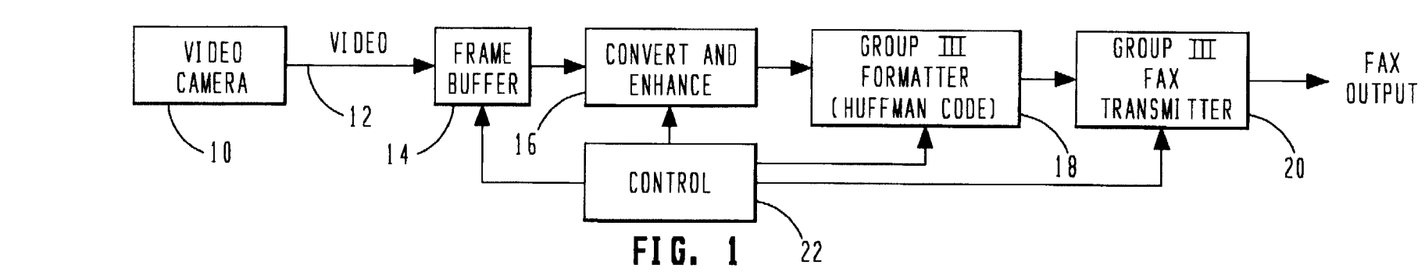
FIG. 1 illustrates a block diagram of the overall system.

Referring now to FIG. 1, there is illustrated a block diagram of the overall system. A video source comprising a video camera 10 generates on an output 12 a video signal. This is a conventional video camera, and the video format is a well-known standard. The video format provides an analog output that is output in a serial manner. The output is comprised of a plurality of horizontal scan lines arranged in a "frame" to provide an image, the images bounded along the horizontal line by the beginning and end of the line, which defines a horizontal sync pulse. The vertical boundaries at the top and the bottom are defined by vertical sync pulses. Therefore, at the beginning of a horizontal sync pulse, a horizontal scan line is initiated and, at the end of the horizontal scan line, another horizontal sync pulse occurs and another horizontal scan line is begun. At the last horizontal scan line, a vertical sync pulse occurs. Again, this is a conventional video format.

The video 12 is received, digitized and stored in a frame buffer 14. The frame buffer 14 allows the sampled video to be stored in the form of pixels. Each sample comprises a digitized analog value which is termed a "sample". This sample is stored as an 8-bit word for conventional black and white. If color is involved, there could be an 8-bit word for each color or four 8-bit words. However, the preferred embodiment is involved only with black and white, although it should be understood that color could be utilized.

The frame buffer 14 is utilized to store the original data for the frame that was received from the video camera 10. This information in its stored state is not compatible with a Group III facsimile output. Therefore, the information in the frame buffer is accessed and input to a conversion device 16 that is operable to convert the information in the frame buffer 14 into a compatible format for a Group III FAX. Further, the information is enhanced and filtered, since conversion from a digitized analog value (gray scale) to a half-tone binary pixel output results in some loss of image. This is achieved with various enhancement devices as will be described hereinbelow.

After conversion and enhancement, the binary bit-mapped information is then input to a Group III formatter 18, which is operable to utilize a Huffman code for formatting the binary pixel information into a compatible format for a Group III transmitter. This is a conventional formatting operation, which provides headers, end of page indications, etc., for the purpose of transmitting a Group III FAX. This is then transmitted to a Group III FAX transmitter 20 to provide an output. The operation of the frame buffer 14, the conversion device 16, the Group III formatter 18 and the Group III transmitter 20 is controlled by a control system 22.

Figure 2:
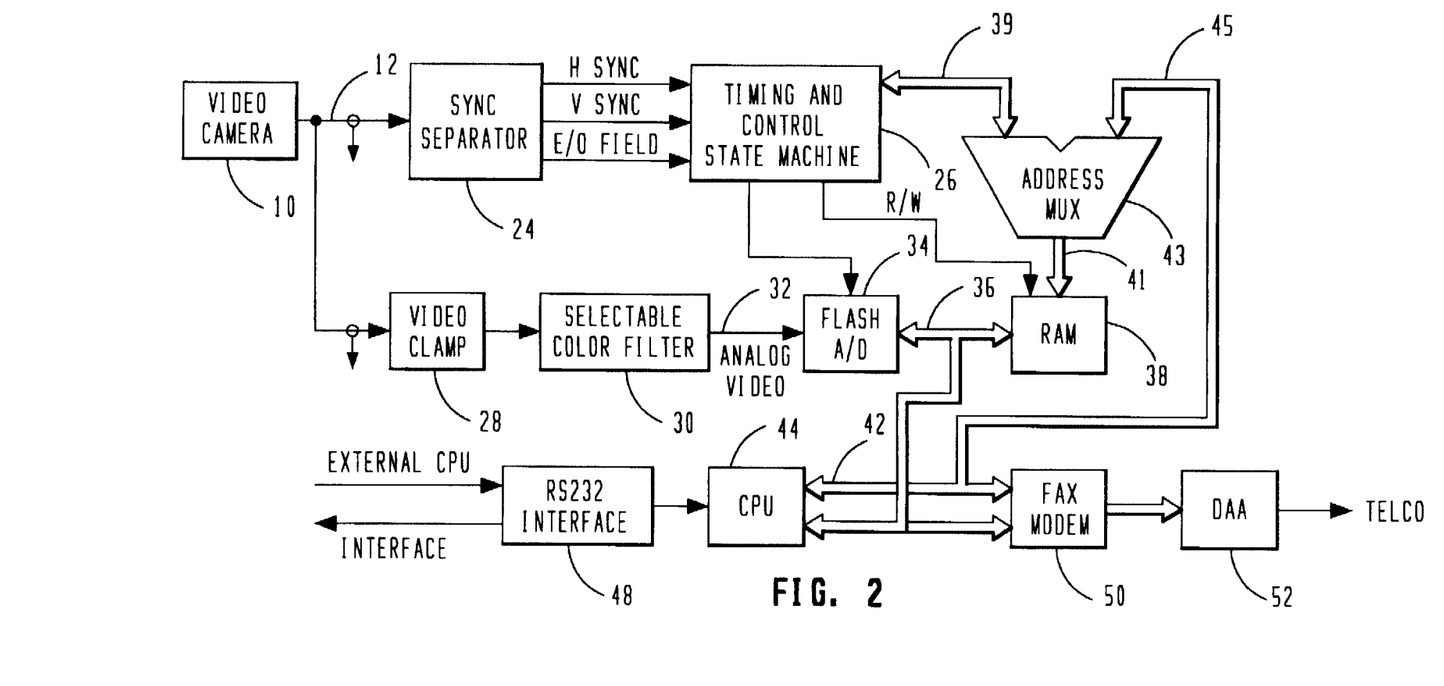
FIG. 2 illustrates a block diagram of the frame grabber.

Referring now to FIG. 2, there is illustrated a more detailed block diagram of the overall system. The video camera 10 has the output thereof input through the line 12 to a sync separator 24. The sync separator 24 is a conventional integrated circuit that is operable to extract from the video signal the horizontal sync (HSync), the vertical sync (VSync) and the even and odd fields. These are input to a timing and control state machine 26. Again, the extraction of the horizontal sync and vertical sync timing signals from the video signal are conventional.

The output of video camera 10 on the line 12 is also input to a video clamp circuit 28, which video clamp circuit is operable to maintain a DC bias on the input video. The output of the video clamp circuit is output to a selectable color filter 30 to provide the selective filtering thereto at a frequency of 3.5 MHz, conventionally referred to as a trap filter. This results in a filtered analog video output signal on line 32. This is processed through a flash analog-to-digital (A/D) converter 34 to provide on a data bus 36 digital data for storage in a RAM 38. The A/D converter 34 and the RAM 38 are controlled by the state machine 26. Additionally, the RAM 38 is controlled through an address/control bus 41, which is output from an address multiplexer 43. The multiplexer 43 has two inputs, one from the state machine 26 through an address bus 39, and one from a CPU 44 through an address bus 45. The data bus 36 is also input to the central processing unit (CPU) 44, CPU 44 providing general control functions thereto. The CPU 44 is operable to interface from an external location to the system through an RS 232 interface circuit 48. Additionally, the CPU 44 is operable to interface through the data bus 36 and the address bus 45 with a FAX modem 50, this then output through a DAA device 52 to the telephone company. The FAX modem 50 is a conventional peripheral device which can either be a chip set or it can be an external board.

In operation, the video information on line 12 is captured as a frame and stored in the RAM 38. The RAM 38 is comprised of more than one device, but is represented as a single block in FIG. 2. The information in the frame buffer, which comprises part of the RAM 38, is processed to enhance and map the information into the output space of a typical Group III facsimile protocol. However, as will be described hereinbelow, the enhanced image is not stored in the RAM 38. Rather, the overall image in the frame buffer is processed to determine how each line should be processed; thereafter each horizontal line of information in the frame buffer internal to the RAM 38 is processed on a line-by-line basis in a serial manner and output to the FAX modem 50 in an "on the fly" operation. However, if sufficient memory were provided, the entire output image could be prestored and then output at a later time.

Figure 3:
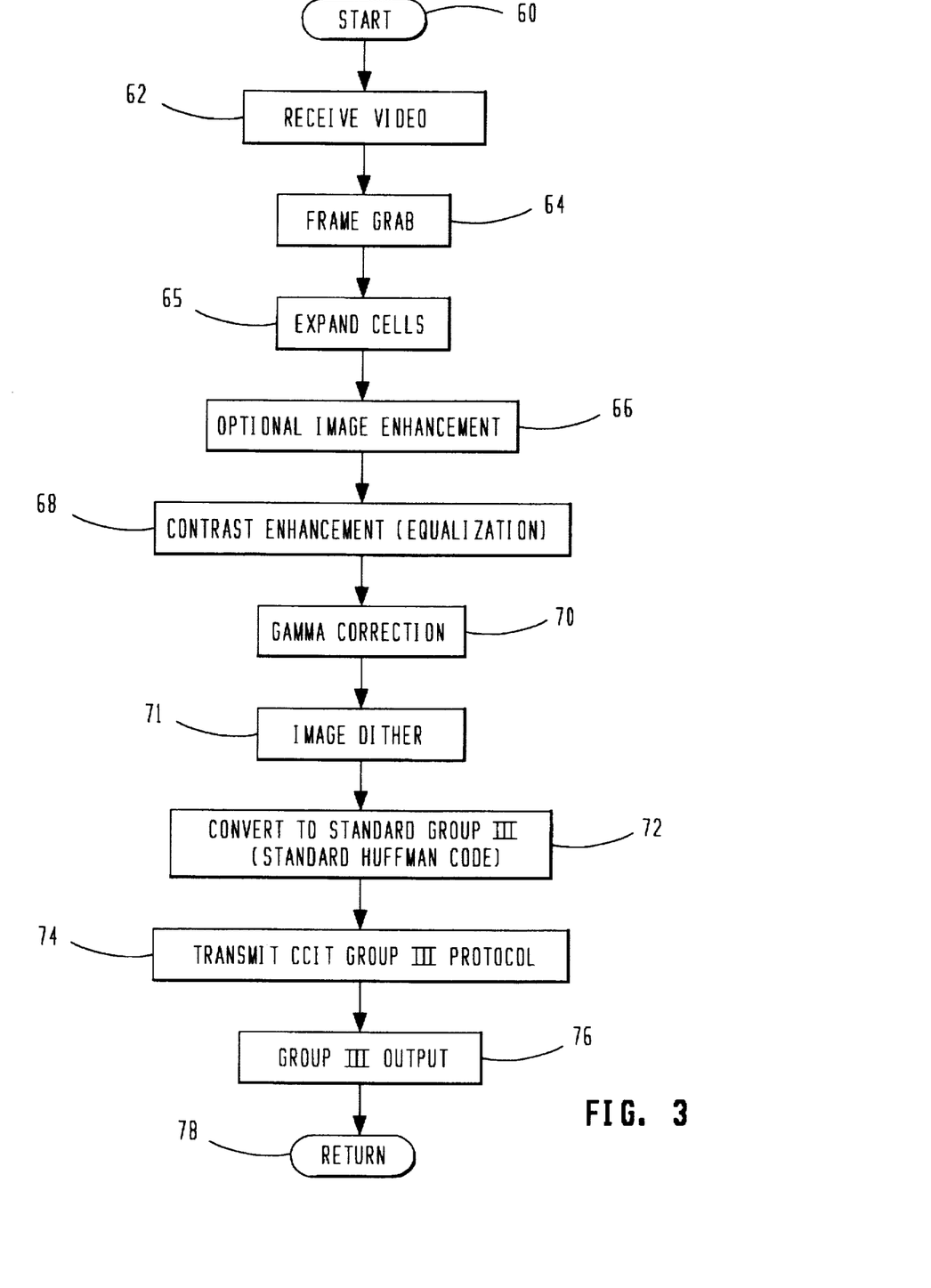
FIG. 3 illustrates a flowchart for the overall operation system.

Referring now to FIG. 3, there is illustrated a flowchart depicting the overall operation of the system. The flowchart is initiated at a block 60 and then proceeds to a function block 62 to receive the video signal. The program then flows to a function block 64 to perform the frame grab operation. As described above, this is an operation whereby the input video signal is digitized and stored in a frame buffer. The program then flows to a function block 65 to expand the number of pixels to a format that will map the number of pixels in a typical frame to the number of pixels in a Group III facsimile. Since they are not the same, it is necessary to increase the number of pixels that represent a single scan line and then map the number of pixels representing the scan line in the frame buffer to that representing the line in a conventional Group III facsimile protocol.

After expansion, the program flows to a function block 66 to perform an optional image enhancement which accents edges, as will be described hereinbelow. The program then flows to a function block 68 to perform a contrast enhancement or equalization. It should be noted that at this point the data is still represented by a gray scale value which is a digitized value stored as an 8-bit word. This, in and of itself, is not compatible with a binary pixel representation that exists with a Group III facsimile protocol. The contrast enhancement is an important aspect of the present invention in that it is "automatic" and the user does not need to adjust it. It merely recognizes in a relatively dark image that intensities can be equalized over the entire surface of the image to remove some of the dark areas and lighten them up. With respect to a relatively light image, the contrast enhancement actually darkens it to highlight some of the finer details. This will be described hereinbelow. The program then flows to a function block 70 to perform a gamma correction (nonlinear intensity correction) and then to a function block 71 to perform an image dither operation. This image dither operation will convert the digitized 8-bit values to binary values of either a dark or a light pixel.

After the image has been fully mapped into a binary pixel map having an aspect ratio compatible with the Group III FAX protocol, the program flows to a function block 72 in order to convert the output to a standard Group III format via a standard Huffman code. This basically adds headers, etc. that are necessary to operate under Group III protocol. The program then flows to a function block 74 to transmit the image at a CCIT Group III protocol FAX and then to a function block 76 representing the Group III FAX output. The program flows to return block 78 to send the next image.

Figures 4, 5:
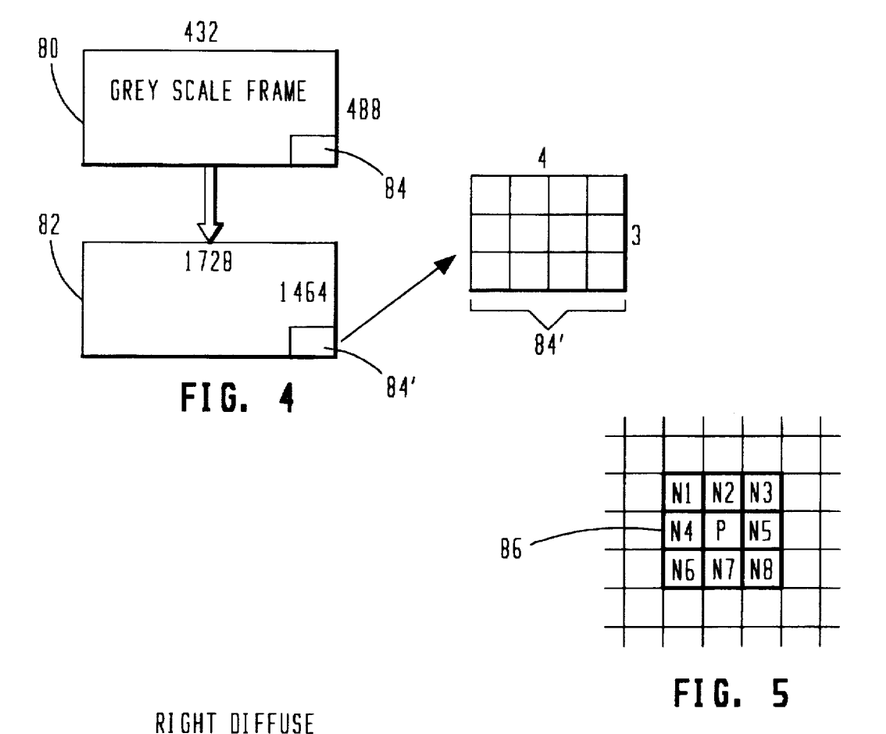
FIG. 4 illustrates a block diagram for the cell expansion.
FIG. 5 illustrates a diagrammatic view of the optional enhancement technique.

Referring now to FIG. 4, there is illustrated a diagrammatic view of the cell expansion routine. A first frame 80 represents the information stored in the frame buffer. As described hereinabove, this information is extracted in the frame grabber operation, digitized and stored in the RAM 38 as a frame of information and maintained therein for processing of the frame until the full image is sent out as a Group III FAX. The information in the frame 80 is arranged as gray scale pixels in a 432×488 format and then each pixel in the frame 80 expanded into a 4×3 space, as represented by a virtual frame 82. The frame 82 is virtual by the fact that it is never completely formed and stored in the RAM 38; rather, it is formed on the fly, as will be described in more detail hereinbelow.

By expanding each pixel in the frame 80 to a 4×3 field, the virtual frame 82 will now have 1728 pixels along the horizontal and 1464 pixels along each vertical column. For descriptive purposes, a single pixel 84 in the frame 80 is mapped as a field 84', the field 84' comprised of four pixels along each horizontal row and three pixels along each column. However, without enhancement, the value of each of the pixels in the frame 84' has the same value as the single pixel 84.

Referring now to FIG. 5, there is illustrated a diagrammatic view of the optional image enhancement procedure. After the cells have been expanded, a moving neighborhood window 86 is moved across the virtual frame 82, the moving input window 86 comprising a 3×3 pixel window having nine pixels contained therein. The center pixel is referred to by "P" with the remaining neighboring pixels around the border thereof referred to by "N1", "N2", "N3", "N4", "N5", "N6", "N7" and "N8". The window 86 moves from left to right along a single row of pixels and then begins at the next row of pixels moving from left to right. The center pixel value "P" is calculated via a spatial filtering technique referred to as an "unsharp filter" algorithm. This algorithm essentially takes the value of the center pixel "P" and multiples it by a factor of three and then subtracts therefrom twice the average of all of the pixels in the moving window by the following equation:

$$P' = 3 \times P - 2 \left\{ \frac{(\Sigma N) + P}{9} \right\} \tag{1}$$

This provides a little "crispness" to the image prior to performing the following steps. Again, this is a general spatial filtering technique.

Figure 6:
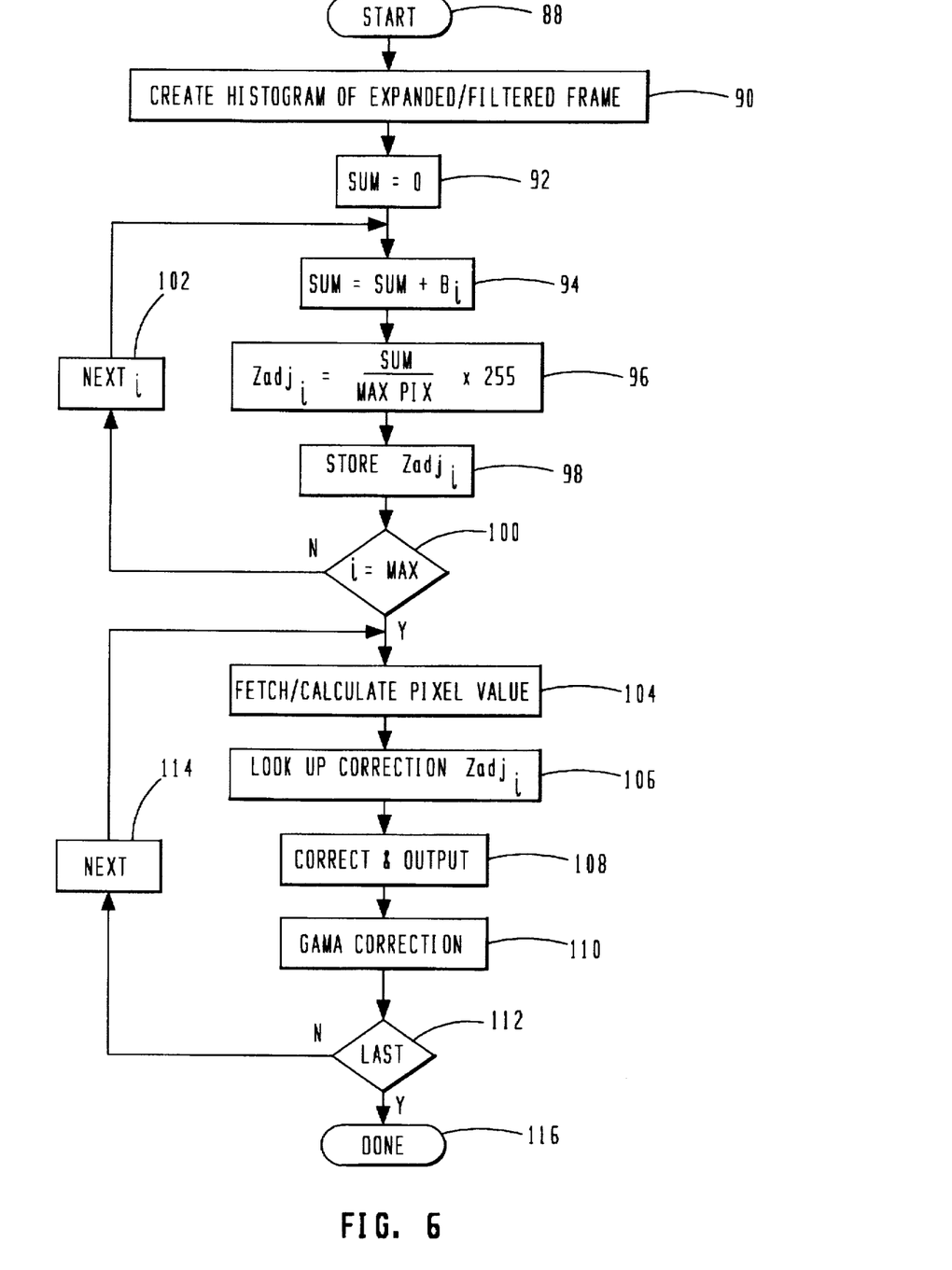
FIG. 6 illustrates a flowchart for the contrast enhancement feature.

Referring now to FIG. 6, there is illustrated a flowchart depicting the contrast enhancement operation. The program is initiated at a start block 88 and then proceeds to a function block 90 to indicate that a histogram is to be formed of the expanded/filtered frame. As described above, the expanded virtual frame 82 is a "virtual" frame in that it is never completely formed and stored in memory, to minimize memory requirements. Therefore, only a predetermined number of horizontal scan lines in the virtual frame 82 are maintained, this corresponding to approximately three horizontal scan lines of the original frame 80. However, in order to create a histogram, it is necessary to first process through all of the pixels in the virtual frame 82. This will therefore require an entire pass through the algorithm with all of the information in the frame for forming the expanded frame and the optional enhancement described above with respect to FIG. 5.

In the first scan through, the program will flow to a function block 92 to set a Sum value equal to zero. The program will then flow to a function block 94 to increase the Sum value by a Bin count value within the histogram. Since there are 256 possible gray scale values for a given pixel, it is necessary to cycle through the virtual frame 82 and determine how many pixels fall in any given gray scale range. If the image were a very dark image, a large number of pixels would fall to the lower end of the histogram; however, if the image were a white image, a large number of pixels would fall in the Bin values at the upper end of the histogram.

For the first pass through, the value of I is set equal to zero such that the value of SUM is increased by the value of $B_0$. The program then flows to a function block 96 to calculate the pixel adjust value $Zadj_i$ as follows:

$$Zadj_i = \frac{SUM}{MAXPIX} \times 255 \tag{2}$$

The value of MAXPIX is, in the preferred embodiment, equal to 2,529, 729 pixels. After the adjusted pixel value for the $i^{th}$ value is calculated, the program flows to a function block 98 to store the adjusted pixel value and then flows to a decision block 100 to determine if the value of i is equal to MAX, i.e., 255. If not, the program flows along the "N" path to a function block 102 to increase the value of i and then back to the input of function block 94 to again increment the value SLIM by the next value of B. This continues until i is equal to 255, at which time the program will flow from decision block 100 along the "Y" path thereof to a function block 104.

Function block 104 is operable to perform the actual contrast enhancement. The function block 104 indicates the operation wherein the pixel value for a given pixel is retrieved, it being a bit word, and then the value calculated The program flows to a function block 106 to lookup the correction $Zadj_i$ from the lookup table, this being calculated in function block 96 in the first pass through the virtual frame 82. The pixel value is then adjusted by this value and output, as indicated by a function block 108. The program then flows to a function block 110 to provide gamma correction to the output contrast enhanced pixel and then to a decision block 112. The gamma correction is a well-known technique which is provided by a lookup table. Therefore, each pixel positioned in the virtual frame 82 has associated therewith a gamma correction factor, which is applied in the function block 110. The decision block 112 determines whether the last pixel in the virtual frame 82 has been corrected and output. If not, the program flows along an "N" path back through a function block 114 to select the next pixel and then back to the input of the function block 104. When the last pixel has been corrected, the program flows along a "Y" path to a Done block 116.

Figure 7:
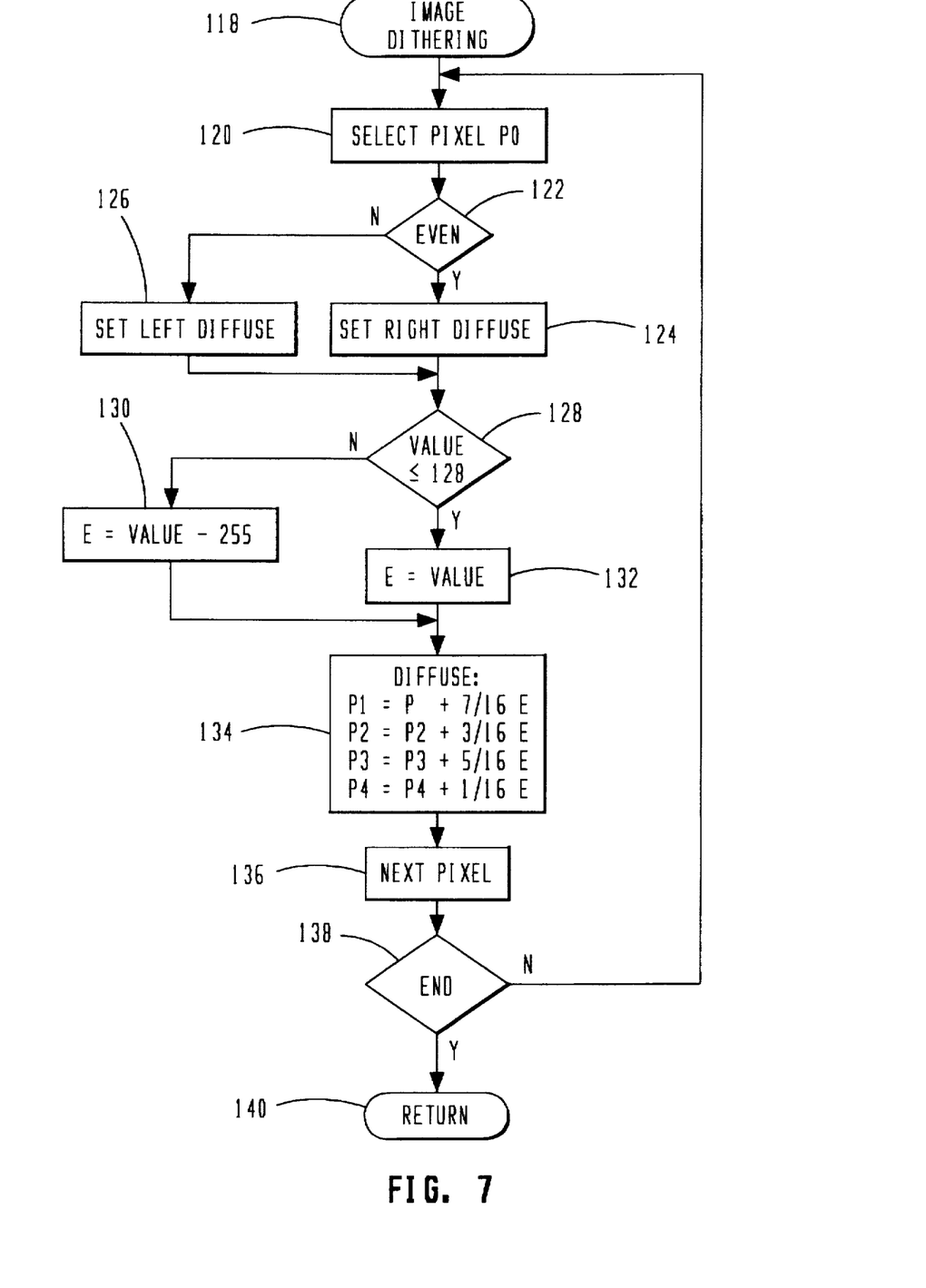
FIG. 7 illustrates a flowchart for the image dithering technique.

Referring now to FIG. 7, there is illustrated a flowchart depicting the image dithering operation, which is initiated at a block 118. As described above, image dithering is required to convert from the 8-bit value output in the contrast enhancement procedure described above with respect to the flowchart of FIG. 6, and convert it to a binary pixel of either a black dot or a white dot. The technique utilized in the present invention is one of diffusing error across the virtual frame 82. It should be noted that the dithering process is operated on-the-fly. The program flows from the block 118 to a function block 120 to select the pixel and then to a decision block 122 to determine if the pixel is selected from an even row or an odd row. As will be described hereinbelow, the error diffusion for an even row diffuses to the right as the row is traversed and then the next row, the output row, is traversed from right to left and, therefore, the error is diffused to the left. If it is an even row, the program flows to a function block 124 along the "Y" path to set the system for a "Right Diffuse" operation. If it is an odd line, the program flows along the "N" path from decision block 122 to a function block 126 to set the system for a "left diffuse" operation. The output of both function block 124 and 126 flow to a decision block 128.

The decision block 128 determines whether the value of the pixel is less than 128, one-half the total value of 256. Essentially, a decision is made that anything above a value of 128 is a white pixel and anything equal to or below a value of 128 is a black pixel. If the value is greater than 128, the program flows along an "N" path to a function block 130 to set the error value "E" to be equal to the value of the pixel minus the value 255. However, if the value is equal to or less than 128, the program will flow from decision block 128 along the "Y" path thereof to a function block 132 to set the error equal to the actual pixel value. The program will then flow to a function block 134 from both function blocks 130 and 132.

Figure 7A:
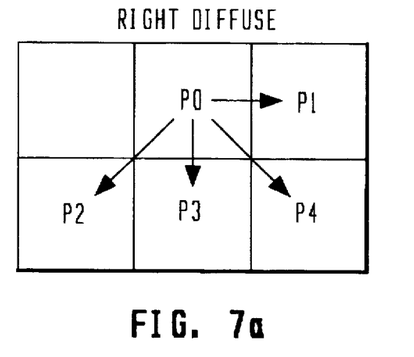
FIGS. 7a and 7b illustrate diagrammatic views for the contrast enhancement operation.

In function block 134, the diffuse operation is performed. The diffuse operation is described with reference to diagrammatic views of FIGS. 7a and 7b. In FIG. 7a, there is illustrated a diagrammatic view of the "fight diffuse" operation and, in FIG. 7b, there is illustrated a diagrammatic view of the "left diffuse" operation. In the diffusion operation to the right, the error in each pixel is diffused to the right, which is referred to as "east", over one and down one, which is referred to as the "southeast" direction, directly down, which is referred to as the "south" direction and one to the left and down, which is referred to as the "southwest" direction. The pixel that is diffused is referred to as the P0 pixel. The east pixel is referred to as P1, the southwest pixel is referred to as P2, the south pixel is referred to as P3 and the southeast pixel is referred to as P4. In the left diffuse operation, the pixel P0 is diffused to the "west" as pixel P1, to the southwest as pixel P4, to the south as pixel P3 and to the southeast as pixel P2. The value of pixels P1, P2, P3 and P4 for both the Right Diffuse and Left Diffuse operation are set forth in the following table:

TABLE 1

Figure 7B:
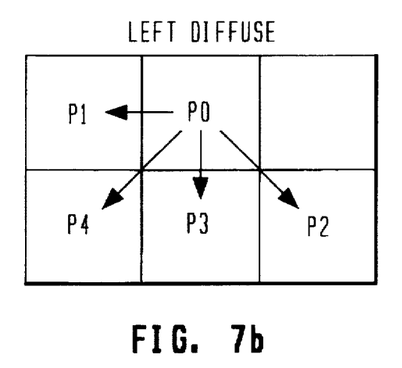

| P1 | P1 + 7/16E |
| P2 | P2 + 3/16E |
| P3 | P3 + 5/16E |
| P4 | P4 + 1/16E |

It can be seen that each of the pixel values is increased by a percentage of the value of "E". Of course, the function block 130 sets this as a negative value such that the error correction is in the negative direction. For example, if the value of P0 were equal to 30 out of a maximum value of 255, this would flow through the function block 132 and the value of E would be equal to "230". the large amount of the error would flow to pixel P1 with the next highest level flowing to pixel P3. The smallest amount would flow to pixel P4. However, if the pixel value were equal to 200, the value of "E" would be −55. Therefore, each of the pixel values P1–P4 would be decreased in value.

After diffusing the error, the program would flow to a function block 136 to select the next pixel, and then to a decision block 138 to determine if this was the last pixel. If not, the program would flow along a "N" path back to the input of a function block 120 and diffuse the error across the next pixel group of pixels. Whenever the edge of a line occurs, the values P1 and P4 would be set to "0". When the end of the virtual frame 82 occurs, the programs flows from decision block 138 to a return block 140.

Figure 8:
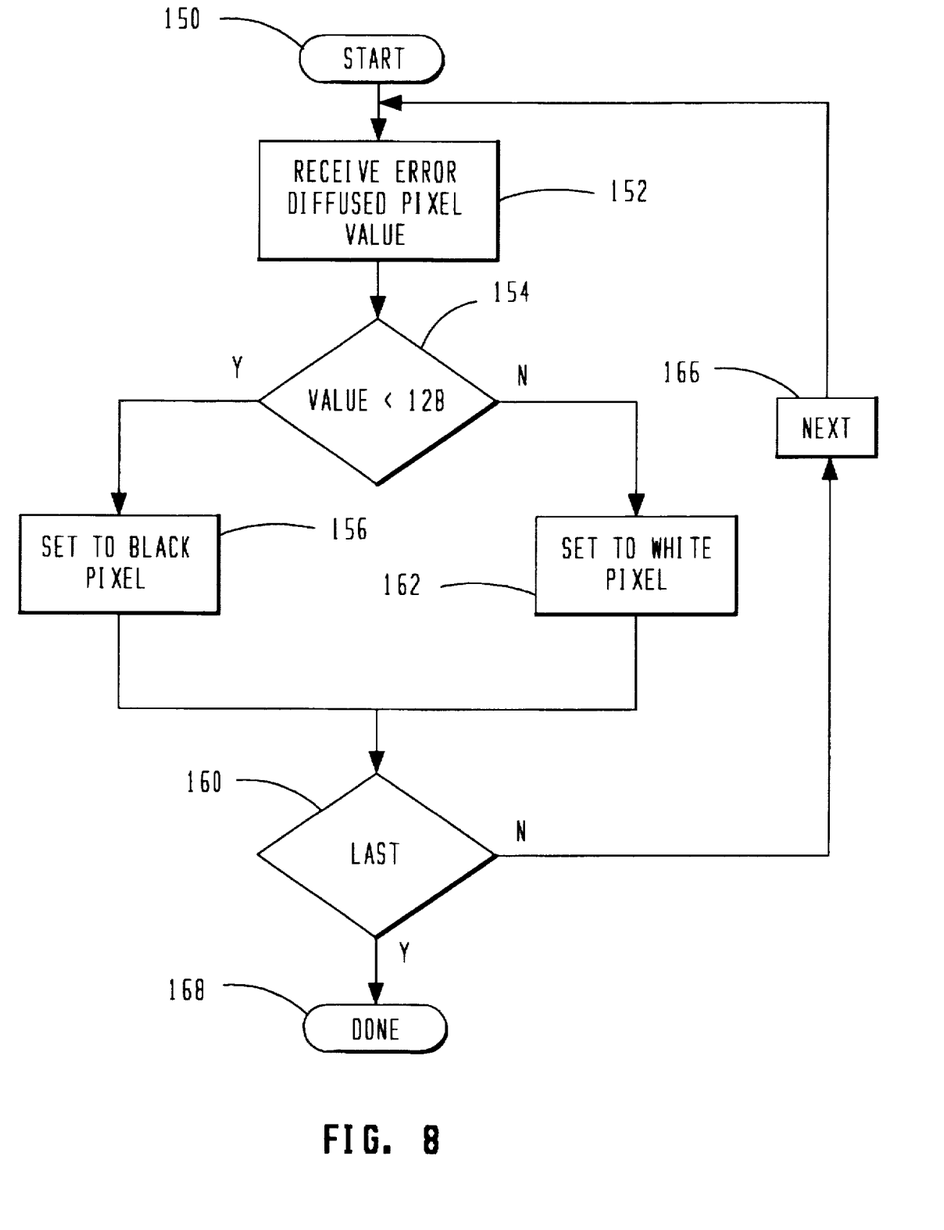
FIG. 8 illustrates a flowchart depicting the setting of the binary pixel value.

Referring now to FIG. 8, there is illustrated a flowchart depicting the setting of the binary pixel value. The program is initiated at a start block 150 and then proceeds to a function block 152 wherein the error diffused pixel value calculated in the flowchart of FIG. 7 is retrieved and then the program flows to a decision block 154 to determine if the value of the error diffused pixel is less than 28. If so, this indicates a black pixel, which is set in a function block 156, and then the program proceeds to a decision block 160. If the value is greater than 128, the program flows along an "N" path to set the value of the pixel to a white pixel, as indicated by a function block 162. The program then flows to a decision block wherein the determination is made as to whether this was the last pixel. If not, the program flows along the "N" path to a function block 166 to select the next pixel and then to the input of function block 152 to receive the next error diffused pixel value. When the last pixel has been processed in the virtual frame 82, the program flows along the "Y" path from decision block 160 to a done block 168.

It can be seen that the contrast enhancement operation requires an entire pass through all values stored in the frame buffer 80 for the original video image that was digitized and stored there. The cell expansion is done as necessary to calculate the various adjusted values for each of the 256 gray scale levels. Once this is done, a lookup table is formed and then a contrast enhancement performed, again only on the selected pixels as they are retrieved for output. Once the histogram values are calculated, it is then only necessary to retrieve pixel values from the frame buffer 80, expand them, apply the contrast enhancement adjustment value thereon and then perform the image dithering operations thereon. After the image dithering operation is performed, i.e., the error diffusion operation, the pixel values are selected as being either a black pixel or a white pixel, based upon the error diffused value as it compares to the threshold of 128. This, therefore, does not require the entire virtual frame 82 to be stored in memory. Since the facsimile output generates a single line at a time, this can be done at the same time that the facsimile is being generated and output in the serial fashion associated with a facsimile transaction.

Although the preferred embodiment has been described in detail, it should be understood that various changes, substitutions and alterations can be made therein without departing from the spirit and scope of the invention as defined by the appended claims.

What is claimed is:

1. A video-to-Group III FAX converter, comprising:

an video input for receiving a video input signal having sequential lines of video information;

a first conversion device for converting said lines of video information to an array of analog pixels in a frame buffer, each of said analog pixels having a digital value that represents an analog sampled value within an associated one of said lines of video information;

a mapping device for mapping said array of said analog pixels in said frame buffer to a binary image space associated with a Group III FAX format as binary image pixels, said binary image space comprising a larger number of binary image pixels than said analog pixels stored in said frame buffer, and wherein said mapping device is operable to expand each of said analog pixels stored in said frame buffer to provide an expanded array of analog pixels having an aspect ratio corresponding to the aspect ratio of said binary image pixels, said mapping device mapping said analog pixels in said frame buffer to said expanded array of analog pixels by mapping said analog pixels to virtual pixels in a virtual frame buffer as intermediate values and having an associated virtual image space substantially similar to the image space of said expanded array of analog pixels such that less than the total number of said virtual pixels corresponding to said binary image pixels are generated and stored at a given time in said virtual frame buffer, said mapping device having a spatial filter for filtering said intermediate mapped pixels in said virtual frame buffer to provide filtered virtual pixels which form said expanded array of analog pixels, said mapping device operable to map said expanded array of analog pixels to said binary image space; and a FAX transmission device for transmitting said binary image pixels in said binary image space via a Group III FAX protocol over a FAX transmission medium.

2. The converter of claim 1 and further comprising a contrast enhancement device for adjusting the digital values in said frame buffer for optimal contrast in said binary image space.

3. The converter of claim 1, wherein only the ones of said analog pixels in said frame buffer associated with a predetermined number of the sequential lines of video information are mapped into said virtual frame buffer at said given time.

4. The converter of claim 1, wherein said virtual frame buffer is comprised of an intermediate virtual frame buffer having intermediate virtual pixels each corresponding to said virtual pixels and an output virtual frame buffer having output virtual pixels each corresponding to said virtual pixels, and said mapping device comprises:

an intermediate mapping device for mapping the values of said analog pixels stored in said in said frame buffer to corresponding ones of said intermediate virtual pixels in said intermediate virtual frame buffer in the aspect ratio of said binary image space;

a binary image mapping device for mapping said intermediate virtual pixels in said intermediate virtual frame buffer to said output virtual pixels in said output virtual frame buffer; and a contrast enhancement device for adjusting the values of said intermediate virtual pixels in said intermediate virtual frame buffer prior to mapping into said output virtual frame buffer for optimal contrast in said binary image space.

5. The converter of claim 4, wherein said contrast enhancement device comprises:

a histogram device for generating a histogram of the contents of said intermediate virtual frame buffer for all of said virtual pixels associated therewith; and an adjustment device for calculating an adjusting factor for each pixel in said intermediate virtual frame buffer in said histogram as a function said generated histogram, and adjusting the value of each of said virtual pixels in said intermediate frame buffer by said associated adjustment factor prior to mapping thereof to said output virtual frame buffer.

6. The converter of claim 5, and further comprising a gamma correction device having a plurality of gamma correction factors stored in a lookup table and operable to correct the values of each of said intermediate virtual pixels in said immediate virtual frame buffer by said associated gamma correction factors stored in said lookup table prior to mapping said intermediate virtual pixels into said output virtual frame buffer by said output mapping device.

7. The converter of claim 5, wherein said binary mapping device comprises means for converting the value of each of said output virtual pixels to a two-state value prior to mapping thereof into said binary image space, one state representing a dark area in said binary image space and one state representing a white image in said binary image space.

8. The converter of claim 7, and further comprising:

an image dithering device for comparing the value of each of said intermediate virtual pixels in said intermediate virtual frame buffer after adjusting the value thereof by said contrast enhancement device to a predetermined threshold and calculating an error relative to said predetermined threshold, said image dithering device operable to diffuse said calculated error across neighboring pixels to said each pixel prior to mapping to said output virtual frame buffer; and a binary decision device for comparing said error diffused values of said output virtual pixels from said output virtual frame buffer after contrast enhancement thereof such that one binary state is generated when said error diffused values exceed said threshold, and the other of said binary image states is generated when said error diffused values is less than said predetermined threshold.

9. The converter of claim 4, wherein said mapping device is operable to map only the ones of said pixels stored in said frame buffer required to generate a single line in said binary image space.

10. A method for converting a video formatted signal into a Group III FAX formatted signal for transmission as a Group III FAX, comprising the steps of:

receiving a video input signal having sequential fines of video information;

converting with a first conversion device the lines of video information to an array of analog pixels in a frame buffer, each of the analog pixels having a digital value that represents an analog sampled value within an associated one of the lines of video information, mapping the array of analog pixels in the frame buffer to a binary image space associated with a Group III FAX format as binary image pixels, the binary image space comprises a larger number of binary image pixels than the analog pixels stored in the frame buffer, and wherein the step of mapping is operable to expand each of the analog pixels stored in the frame buffer to provide an expanded array of analog pixels having an aspect ratio corresponding to the aspect ratio of the binary image the step of mapping the analog pixels in the frame buffer to the expanded array of analog pixels mapping the analog pixels to virtual pixels in a virtual frame buffer as intermediate values and having an associated virtual image space substantially similar to the image space of the expanded array of analog pixels such that less than the total number of the virtual pixels corresponding to the binary image pixels are generated and stored at a given time in the virtual frame buffer, the step of mapping filtering the intermediate mapped pixels in said virtual frame buffer with a spatial filter to provide filtered virtual pixels which form the expanded array of analog pixels, the step of mapping operable to map the expanded array of analog pixels to the binary image space; and transmitting the binary image pixels in the binary image space via a Group III FAX protocol over a FAX transmission medium.

11. The method of claim 10, and further comprising the step of adjusting the digital values in the frame buffer for optimal contrast in the binary image space.

12. The method of claim 10, wherein only the ones of the analog pixels in the frame buffer associated with a predetermined number of the sequential lines of video information are mapped into the virtual frame buffer via the step of mapping at the given time.

13. The method of claim 10, and further comprising providing an intermediate virtual frame buffer having intermediate virtual pixels, each corresponding to the virtual pixels and providing an output virtual frame buffer having output virtual frame pixels, each corresponding to the virtual pixels, and wherein the step of mapping comprises:

mapping in an intermediate mapping step the values of the analog pixels stored in the frame buffer to corresponding ones of the intermediate virtual pixels in the intermediate virtual frame buffer in the aspect ratio of the binary image space;

mapping in a binary image mapping step the intermediate virtual pixels in the intermediate virtual frame buffer to the output virtual pixels in the output virtual frame buffer; and ajusting the values of the intermediate virtual pixels in the intermediate virtual frame buffer prior to mapping into the output virtual frame buffer for optimal contrast in the binary image phase.

14. The method of claim 13, wherein the step of adjusting the values of intermediate virtual pixels comprises the state of:

generating a histogram of the contents of the intermediate virtual frame buffer from all the virtual pixels associated therewith; and calculating an adjusting factor for each pixel in the intermediate virtual frame buffer in the histogram as a function of the generated histogram, and adjusting the value of the virtual pixels in the intermediate frame buffer by the associated adjusting factor prior to mapping thereof to the output virtual frame buffer.

15. The method of claim 14, and further comprising the step of storing a plurality of gamma correction values in a lookup table and correcting the values of each of the intermediate virtual pixels in the intermediate virtual frame buffer by the associated gamma correction factors stored in the lookup table prior to the step of mapping the intermediate virtual pixels into the output virtual frame buffer.

16. The method of claim 14, wherein the step of mapping comprises the step of converting the value of each of the output virtual pixels to a two-state value prior to mapping thereof into the binary image space, one state representing a dark area in the binary image space and one state representing a white image in the binary image space.

17. The method of claim 16, and further comprising the steps of:

comparing in an image dithering device the value of each of the intermediate virtual pixels in the intermediate virtual frame buffer after the step of adjusting the value thereof to a predetermined threshold;

calculating an error relative to the predetermined threshold;

diffusing the calculated error across neighboring pixels to each pixel prior to mapping to the output virtual frame buffer; and comparing the error diffused values of the output virtual pixels from the output virtual frame buffer after the step of adjusting the values thereof by the adjusting factor such that one binary state is generated when the error diffused values exceed the threshold and the other of the binary image states is generated when the error diffused view is less than the predetermined threshold.

18. The method of claim 13, wherein the step of mapping is operable to map only the ones of the pixels stored in the frame buffer required to generate a single line in the binary image space.

* * * * *

UNITED STATES PATENT AND TRADEMARK OFFICE
CERTIFICATE OF CORRECTION

PATENT NO. : 5,546,194

DATED : August 13, 1996

INVENTOR(S) : Ross

It is certified that error appears in the above-identified patent and that said Letters Patent is hereby corrected as shown below:

Column 2, line 19, delete "convening", and insert therefor --converting--;

Column 6, line 39, delete "SLIM", and insert therefor --SUM--;

Column 7, line 37, delete ""fight diffuse""; and insert therefor --"right diffuse"--;

Column 8, line 21, delete "28", and insert therefor --128--;

Signed and Sealed this

Eighth Day of July, 1997

Attest:

BRUCE LEHMAN

*Attesting Officer*  *Commissioner of Patents and Trademarks*